(12) United States Patent
Krishnamurthy

(10) Patent No.: US 8,156,556 B2
(45) Date of Patent: Apr. 10, 2012

(54) METHOD AND APPARATUS FOR PROVIDING MOBILE HONEYPOTS

(75) Inventor: Balachander Krishnamurthy, New York, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1721 days.

(21) Appl. No.: 11/081,261

(22) Filed: Mar. 15, 2005

(65) Prior Publication Data

US 2005/0210534 A1    Sep. 22, 2005

Related U.S. Application Data

(60) Provisional application No. 60/553,836, filed on Mar. 16, 2004.

(51) Int. Cl.
*H04L 9/00* (2006.01)

(52) U.S. Cl. ........... 726/23; 726/2; 726/11; 726/22; 726/25; 713/194; 709/223; 709/224

(58) Field of Classification Search .......... 713/1, 2, 713/188, 194; 380/200, 201, 255, 277; 726/2, 726/23, 25, 11, 22; 709/223–225

See application file for complete search history.

(56) References Cited

U.S. PATENT DOCUMENTS

| | | | | |
|---|---|---|---|---|
| 6,487,204 B1 * | 11/2002 | Dacier et al. | ............... | 370/395.2 |
| 6,772,196 B1 * | 8/2004 | Kirsch et al. | ................... | 709/206 |
| 7,149,778 B1 * | 12/2006 | Patel et al. | ................... | 709/206 |
| 7,296,274 B2 * | 11/2007 | Cohen et al. | ................... | 719/315 |
| 7,333,461 B2 * | 2/2008 | Thubert et al. | ................ | 370/338 |
| 7,367,051 B1 * | 4/2008 | Siegrist et al. | ..................... | 726/3 |
| 7,383,578 B2 * | 6/2008 | Blake et al. | ..................... | 726/23 |
| 7,392,262 B1 * | 6/2008 | Alspector et al. | ............. | 707/102 |
| 7,412,723 B2 * | 8/2008 | Blake et al. | ..................... | 726/23 |
| 7,437,766 B2 * | 10/2008 | Cohen et al. | .................... | 726/26 |
| 7,464,407 B2 * | 12/2008 | Nakae et al. | ..................... | 726/22 |
| 7,549,166 B2 * | 6/2009 | Baffes et al. | ..................... | 726/23 |
| 2004/0249952 A1 * | 12/2004 | Roderique | .................... | 709/227 |
| 2005/0050353 A1 * | 3/2005 | Thiele et al. | .................. | 713/201 |
| 2005/0120019 A1 * | 6/2005 | Rigoutsos et al. | ................. | 707/6 |
| 2005/0129019 A1 * | 6/2005 | Cheriton | ...................... | 370/392 |
| 2005/0246440 A1 * | 11/2005 | Yu | ................................. | 709/225 |

FOREIGN PATENT DOCUMENTS

WO    WO 00/62167    10/2000

OTHER PUBLICATIONS

EPO Search Report dated Jun. 30, 2005, of corresponding European Patent application No. EP 05 10 2036, 3 pages.
Cohen, F: "A Mathematical Structure of Simple Defensive Network Deceptions", Computers & Security, Elsevier Science Publishers, Amsterdam, NL, vol. 19, No. 6, Oct. 1, 2000, pp. 520-528.
Cohen, F. et al: "Leading Attackers Through Attack Graphs With Deceptions", Computers & Security, Elsevier Science Publishers, Amsterdam, NL, vol. 22, No. 5, Jul. 2003, pp. 402-411. SIGCOMM 04 Workshops, Sep. 3, 2004, XP002333835, Retrieved from the Internet: URL:http://www.research.att.com/{bala/papers/mohonk.pdf>.
Arbor Networks Tech Report, Nov. 13, 2001, XP002333836, Retrieved from the Internet: URL:http://research.arbornetworks.com/downloads/research38/dark_address_space.pdf>.
Examiner's Report for CA 2,500,847, Apr. 17, 2008, pp. 1-3.

\* cited by examiner

*Primary Examiner* — Aravind Moorthy
*Assistant Examiner* — Joseph Pan

(57) ABSTRACT

A method and apparatus for detecting an originator of traffic of interest is provided. One or more honeypots are established. Mobility is then provided to the one or more honeypots. In one embodiment, mobility is provided by communicating information associated with one or more dark prefixes. In another embodiment, mobility is provided by varying information related to the one or more dark prefixes.

15 Claims, 3 Drawing Sheets

METHOD AND APPARATUS FOR PROVIDING MOBILE HONEYPOTS

CROSS-REFERENCE TO RELATED APPLICATIONS

This application claims benefit of U.S. provisional patent application Ser. No. 60/553,836, filed Mar. 16, 2004, which is herein incorporated by reference.

BACKGROUND OF THE INVENTION

The present invention generally relates to computer security. More particularly, the present invention relates to an apparatus and method for detecting an originator of hostile traffic in a network.

There have been several attempts to identify originators of attack packets on the network. A network telescope provides the ability to see victims of certain kinds of denial of service attacks or hosts infected by worms, and misconfigurations from a distance. Tarpits have been deployed to waste resources of suspicious attack sources. Honeypots can help identify suspicious IP addresses.

A common technique is a honeypot mechanism and is defined broadly as a resource whose value lies in its unauthorized use. Simple honeypot mechanisms involve advertising dark address space (a set of internet protocol (IP) addresses that are not currently in use; i.e., associated with active machines) and identify originators of traffic to that space. The assumption is that such sources are suspicious. Some honeypots listen passively to such traffic. Neither the advertisements of dark prefixes nor the passive listening to incoming traffic is particularly expensive. Other honeypots interact with the traffic to varying degrees. Some respond with acknowledgements to the incoming messages or emulate a login session. At the other extreme, some honeypots may emulate a whole kernel. Depending on the degree of interaction more details about the attack traffic can be gathered. Public domain versions of honeypot code for popular operating systems have been available for different variants of probing attacks along with commercial software indicating the popularity of this technique for identifying probe traffic. The broad notion of honeypots has even been used to locate spam email originators although such honeypots need to have more infrastructure in place.

Since honeypots gather data at the destination of probing and other unwanted traffic, they are unable to locate the precise entry point of such traffic; additionally some of the source addresses may be spoofed. Traceback to the origination of such traffic is hard due to the delay and difficulty of maintaining state along the path of such traffic. Most importantly, the autonomous systems (ASes) in the path towards the destination are not aware that the advertised prefix is dark. Thus, the ASes in the path carry such traffic towards the destination and are unable to benefit from the knowledge that the originators of such traffic are potentially suspect. Finally, the AS at which such traffic originated cannot learn about the link responsible for injecting this traffic.

Therefore, there is a need in the art for a method and apparatus for detecting an originator of hostile traffic closer to an entry point of such traffic.

SUMMARY OF THE INVENTION

The present invention generally relates to a method and apparatus of detecting an originator of traffic of interest, e.g., hostile traffic. In one embodiment, one or more honeypots are established. Mobility is then provided to the one or more honeypots.

In one embodiment, mobility is provided by communicating information associated with one or more dark prefixes. In another embodiment, mobility is provided by varying information related to the one or more dark prefixes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
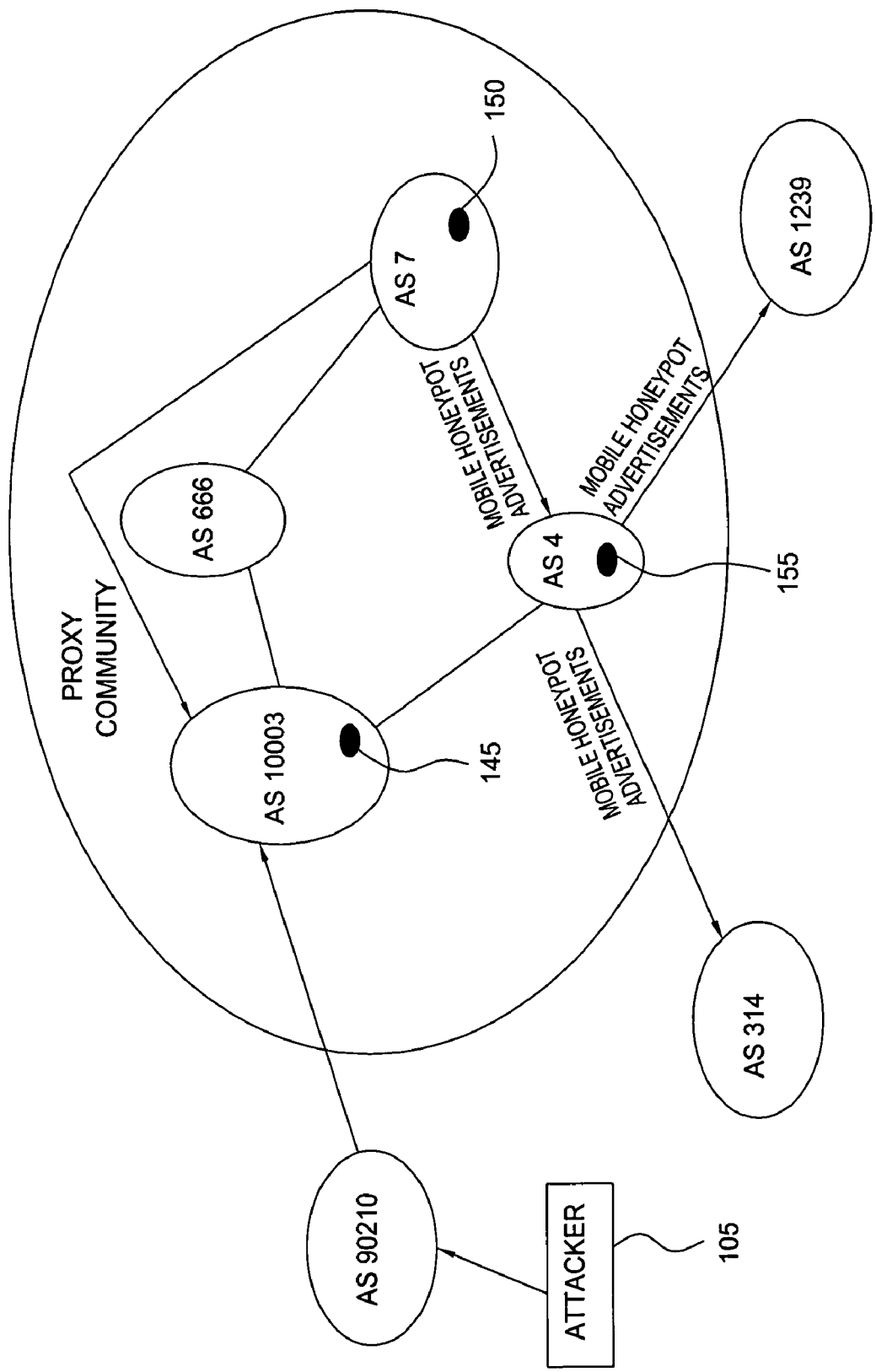
FIG. 1 illustrates a system in accordance with one embodiment of the present invention.

The present invention relates to a method and apparatus for detecting a source of traffic of interest, e.g., unwanted traffic (e.g., packets) closer to the point of entry. To share the information about dark prefixes to upstream autonomous systems (ASes), mobile honeypots are provided with a goal of detecting unwanted traffic significantly closer to its origin. The mobility stems from two aspects. In one embodiment, the information about the darkness of the prefixes is made available to the upstream ASes. The mobility of this information enables multiple participants to be aware of attack sources earlier. In another embodiment, the list of dark prefixes can also be changed aperiodically and thus, from the attackers viewpoint the honeypots appear to be mobile.

The mobile honeypot technique is a low cost, reliable mechanism that cannot be easily reverse engineered or attacked easily by malicious entities on the internet. The information gleaned from suspicious traffic is dynamically shared with a network of friendly ASes. Each AS that learns about prefixes responsible for generating significant amounts of unwanted traffic is free to take remedial action. For example, if the ASes along the path know that the destination towards which traffic is being carried is a honeypot, they can drop such traffic and simply inform downstream ASes about these addresses using out of band mechanisms.

ASes would be motivated to cooperate in such a mechanism for various reasons. For example, information about sources that are generating significant amount of probing or other traffic can be used by any of the ASes along the path. They could decide to graylist or drop all traffic from these sources when they are destined to their customers. Source-based filtering is typically not done as it carries a higher risk. However, as information about repeated probings spread, the source information can be selectively used by ASes along the path to influence their policies. Each of the ASes cooperating in the scheme can optionally augment the advertisements of dark prefixes. As each co-operating AS filters out traffic at the earliest possible upstream location and passes on the information about source IP addresses, there is potential reduction of unwanted traffic entering the Internet through any of the cooperating network of ASes. Additionally, since ASes that are closer to the sources of such unwanted traffic is made aware of the suspicious activities, it is now possible to more accurately identify the originating source of such unwanted traffic.

An AS may own several prefixes. This AS may pick a subset of the prefixes and tell the outside world, i.e., neighboring ASes, via advertisements, that it is willing to accept traffic destined towards those prefixes. One or more of the advertised dark prefixes may be designated as dark prefixes by the AS. The neighboring ASes that receive these announcements then watch for traffic destined to the IP addresses included in the dark prefixes and if there is any traffic, this traffic is routed towards the AS that advertised the announcements.

FIG. 1 illustrates a system in accordance with one embodiment of the present invention. FIG. 1, shows a plurality of autonomous systems (ASes), i.e., AS 90210, AS 10003, AS 666, AS 7, AS 4, AS 314, and AS 1239. An autonomous system (AS) is a unit of router policy, either a single network or a group of networks that is controlled by a common network administrator (or group of administrators) on behalf of a single administrative entity (such as a university, a business enterprise, or a business division). An autonomous system is also sometimes referred to as a routing domain. An autonomous system is assigned a globally unique number, sometimes called an Autonomous System Number (ASN). Networks within an autonomous system communicate routing information to each other using an Interior Gateway Protocol (IGP). An autonomous system shares routing information with other autonomous systems using the Border Gateway Protocol (BGP).

A plurality of honeypots are established. Honeypots are information resources whose value lies in unauthorized or illicit use of that resource. Advertised dark prefixes are indicated by elements 145, 150, 155. In one embodiment, machines (not shown), e.g., servers, listen to traffic aimed at the dark prefixes in order to determine the source of the unwanted traffic. In one illustrative example, the traffic of interest, e.g., probe traffic of an attacker 105 enters via AS 90210. AS 7 is shown sending mobile honeypot advertisements to AS 4. AS 4 passes the mobile honeypot advertisements on to AS 314 and AS 1239, both of which participate in the scheme although they don't advertise their own dark prefixes. AS 666 is bypassed (figuratively) by using the Proxy Community attribute to have AS 10003 monitor traffic towards the dark prefix 150 of AS 7.

Figure 2:
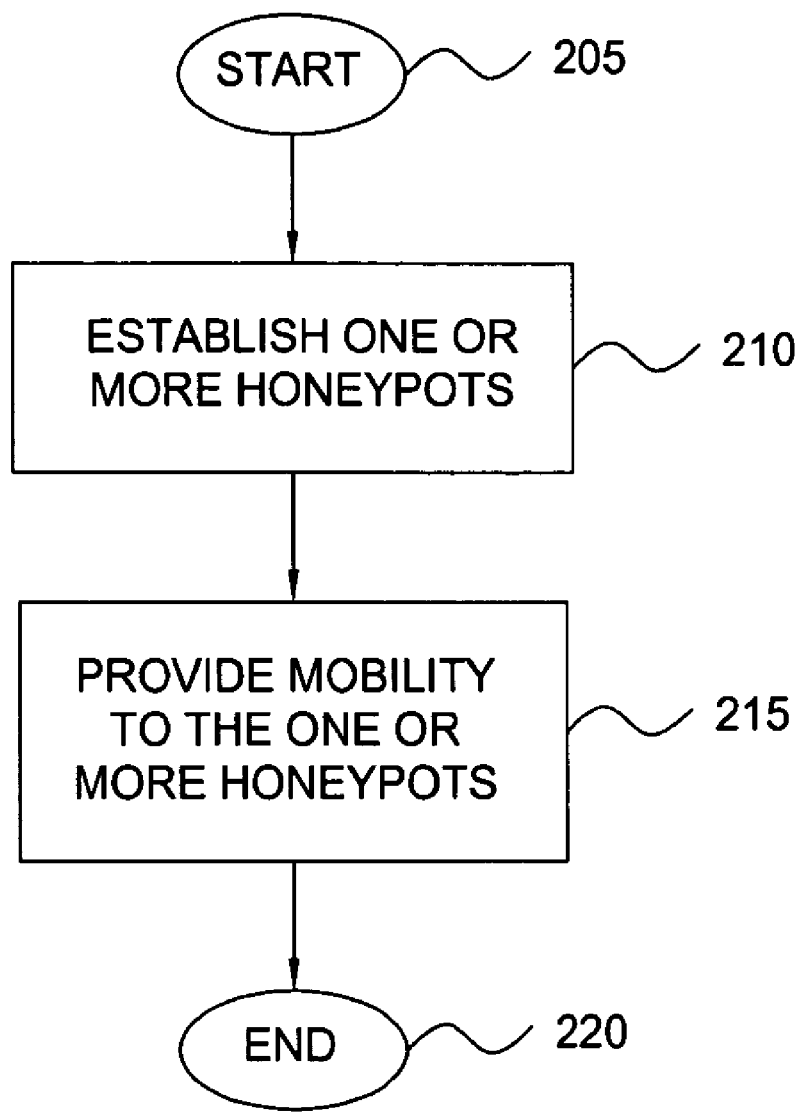
FIG. 2 illustrates a flow diagram of a method in accordance with one embodiment of the present invention.

FIG. 2 illustrates a flow diagram of a method 200 in accordance with one embodiment of the present invention. Method 200 begins at step 205.

In step 210, one or more honeypots are established. Establishing honeypots comprises establishing, on an AS, one or more dark prefixes (e.g., address space that is capable of being monitored for traffic of interest, e.g., unwanted traffic) associated with one or more destinations. The one or more dark prefixes are advertised on at least one AS. Data associated with traffic (e.g., packets) received by the one or more destinations directed towards the dark prefixes is collected.

In step 215, mobility is provided to the one or more honeypots. The mobility of honeypots refers to the movement of information associated with dark prefixes as well as the changes in the set of dark prefixes advertised.

In one embodiment, mobile honeypots are provided by changing the set of advertised dark prefixes. In one embodiment, changes in the set of dark prefixes advertised are provided by allowing an AS participating in the mobile honeypot scheme to tailor the operation of three parameters: prefix length, duration of advertisement, and threshold of packet count.

Each AS selects, at random, a varying subset of dark prefixes of differing lengths (e.g., a /24 typically) and advertises them. The advertisement is withdrawn after a certain random duration subject to some minimum and maximum time period limits. Along with the prefix and varying with the length, a threshold count of packets is identified. If the number of packets received at that destination exceeds that threshold within the duration of advertisement, then the originator is deemed as suspicious. This threshold is set in a manner that allows for the somewhat benign probing associated with discovery of new prefixes (by Internet mapping entities and researchers). The algorithm for choosing prefixes, their liveness duration, and the count threshold are all independently determined by the participating ASes based on their traffic patterns and expected number of packets within a time interval. Along with the advertisement, an optional field is used to enable the upstream AS to drop the traffic but pass on the information about the originator. Actual BGP mechanisms for this optional field will be discussed below in greater detail.

Acceptable dark addresses are chosen using certain criteria. Synthetic models can be utilized to help identify the number of addresses that can be used as honeypot sources. The goals of selecting addresses are multiple:

1. The attackers should be able to reach one of the selected addresses (i.e., the honeypot must attract a few bees) within the live duration of the prefix. The set of addresses should be large enough but presumably not too large to reduce false positives;

2. The non-cooperating ASes (or even co-operating ASes) should not be able to infer anything significant from the dark prefixes announced. ASes are concerned about this due to business and competitive reasons. Since an AS is free to withdraw the announcement of a dark prefix and assign it to a customer at any point in time in the future, the ASes that saw the announcement will not be able to infer anything of value from them.

3. If a dark address space is later assigned to valid customers, there should be little risk of traffic being dropped by upstream ASes.

In one embodiment, mobile honeypots are provided by sharing information associated with dark prefixes. In one embodiment, there are two modes of operation for mobile honeypots: non-cooperative and co-operative. In the non-cooperative mode of operation, the announcing AS does not have to inform upstream ASes that a particular prefix is dark. A standard BGP announcement about a prefix is used and withdrawn after a certain duration. An internal threshold is used to conclude that when traffic for the prefix exceeds the threshold, the originator of such traffic is involved in sending spurious packets. In the non-cooperative mode, the unwanted traffic is carried all the way back to the announcer of the advertisement. The information about the originator can only be shared later with others in the path.

In the co-operative mode of operation, interested ASes add a tag in the community parameter in the BGP advertisement, so that the upstream ASes are aware of the dark nature of the prefix. Upstream ASes filter traffic directed towards these dark prefixes in one of two ways: Upstream ASes can identify the traffic, record the information and pass it on; or Alternately, upstream ASes could drop the traffic but log the information and send it using out of band mechanisms to the cooperating set of ASes.

In the noncooperative mode, the non-participating ASes accept updates (advertisements and withdrawals) on existing BGP connections and carry any traffic destined towards these prefixes. The volume of such traffic is not likely to be too high for them to be adversely affected and examining the economics of settlements, there is no potential downside. In the cooperative mode, where ASes actually know in advance that traffic destined towards the dark prefixes is unwanted, they can record the originator and then filter such traffic. Co-operating ASes would have to start maintaining additional checks for traffic towards a collection of prefixes exceeding specified threshold during the live window. Once the ASes have learned about the source addresses, they can optionally modify their access control to examine any traffic destined towards their own customers originating from these source addresses. ASes may also tailor finer grained monitoring of such addresses. If the co-operating ASes are actively going to drop packets (i.e., filter), the ASes have to install counters for the live duration of advertised dark prefixes and ensure that the ASes can modify Access Control List (ACL) information to filter traffic based on destination addresses. This would require ASes to employ techniques similar to remote black-holing. When traffic (e.g., packets) destined for address is dropped quietly, the destination is considered to have been blackholed. Normally dropped messages may generate an error or a bounce message, however, blackholed traffic simply disappears. As such, the blackholed traffic is actively discarded with no errors raised.

Each of the ASes cooperating in the scheme can optionally augment the advertisements of dark prefixes with their own. As each co-operating AS filters out traffic at the earliest possible upstream location and passes on the information about source IP addresses, there is potential reduction of unwanted traffic entering the Internet through any of the cooperating network of ASes. Co-operating ASes can tailor their choice of dark prefixes, their length, and duration, based on the dark prefixes it sees from its neighbors. Although they cannot control the choices of other ASes, there is a potential for loose cooperation to maximize the ability to identify attackers. For example, an attacker's choice of address ranges and the thresholds chosen by individual ASes can be shared to help influence the selection of future dark prefixes and thresholds. When a group of ASes co-operate in the mobile honeypot scheme, the sum of the knowledge gained can greatly benefit all the cooperating entities. The positive network externalities of such co-operation results in benefits accruing to all the participants at low cost to the individual ASes. Note that such cooperation is obtained at relatively low cost without yielding any AS-specific information that may be viewed as sensitive. ASes that do not participate in the scheme and at the edge of the network of cooperating ASes may be viewed as a source of transmitters of unwanted traffic. Communication from such immediate neighbors may be downgraded if the threshold of such unwanted traffic exceeds a threshold. Since there are only benefits associated with learning about sources of unwanted traffic, ASes have a logical reason to cooperate to watch for traffic towards various dark prefixes. As a control measure, the originator of the advertised dark prefixes can test the effectiveness by including the community tag in some of the announcements and omitting it in some.

The BGP protocol is utilized to implement mobile honeypots. There are four features of the BGP protocol that are of interest to mobile honeypot implementation. The first two are part of the BGP-4 standard while the other two are extensions that have been proposed. The first is the Attribute value field in a BGP announcement (a BGP announcement consists of a prefix and optional attribute values). Of the 256 possible Attribute values, around half a dozen are used frequently (AS_PATH, NEXT_EOP, LOCALYREF, MULTLEXT-DISC, COMMUNITY, ORICINATORJD, and CLUSTER. LIST). Mobile honeypots use the COMMUNITY field since it has no predefined meaning; i.e., it can be used for any experimental purpose without breaking any existing interpretation. Mobile honeypots use the COMMUNITY field to tag dark space advertisements as such. Community fields have been increasingly used as a way of signaling between adjacent and non-adjacent ASes. The second aspect is one of three specific reserved values of the community field: 0xFFFFFF02, which informs a BGP neighbor not to pass on the community value further to its neighbors. This allows any mobile honeypot compliant AS to restrict dark space advertisements to just their immediate neighbors. The third aspect is the Proxy Community Community value proposal (implemented as a Flexible Community value), which enables requesting an AS to send a community to a specific neighbor. The manner in which mobile honeypots use this extension is tailoring it to a specific AS which is suspected to be the origin (or closest to the origin) of unwanted traffic. As the Proxy Community proposal points out, the originating AS can influence the selection of path and is a form of destination based traffic engineering. The last aspect is a policy accounting mechanism whereby the BGP table-map command can be used to classify prefixes in the routing table by BGP attribute. Packet counters can be incremented on a per-input interface basis.

An AS interested in participating in the mobile honeypot scheme would determine a set of dark prefixes of varying lengths it can use as dark prefixes. Based on its past traffic patterns it can select a threshold ranging from a few tens to a few hundreds of packets for categorizing traffic as a probing attack. The threshold and past traffic together enables coming up with the third parameter: advertisement duration of the dark prefix. Once these values are chosen, a routine BGP announcement is sent on one or more randomly chosen dark prefixes from the collection. The community attribute is set to darkfake. The reserved field of NOADVERTISE (0xffffff02) is set if the advertisement is meant only to the immediate peer and is not meant to be forwarded on. The optional value of targeting only a remote AS is set if needed. The announcement is withdrawn after the determined duration (typically of the order of several hours).

On the associated honeypot machine, default replies are optionally sent back to the probing packets. The addresses are recorded and the packet count is checked to see if it has crossed the threshold associated with the prefix. Once the threshold has been crossed, the address is sent to the co-operating set of ASes either piggybacked with the withdrawal or using out of band mechanism. The amount of information that is to be shared will guide is on the frequency and manner of sharing it between the interested ASes.

Each new proposal to augment the work done in BGP communication is added overhead to the BGP protocol. While the potential reduction in unwanted traffic offsets the cost, it is still useful to examine the overhead associated with mobile honeypots. The overhead consists of the following: 1. The onetime cost of identifying dark prefixes, threshold and announcement duration; 2. Processing mobile honeypot related advertisements and withdrawals; 3. The accounting of packet count for each advertised dark prefix and recording the probe addresses; 4. Identifying the link associated with probe addresses if they belong to the AS; and 5. any policy-related overhead of using the probe addresses to change ACLs in routers or fine tuning anomaly detection on suspect links.

Overhead scenarios 1 and 2 have very low cost. If there are too many mobile honeypot related updates, it should not overwhelm any AS since ASes are free to ignore Community attributes. Given that no new connections have to be set up (advertisements and withdrawals are on existing BGP sessions) there is no significant network overhead. The cost related to scenario 3 is likely to come down over time as the AS responsible for injecting the traffic can be targeted to be the one to do the accounting. Accounting only needs to be done by the AS at the edge of the co-operating set. The rest of the ASes do not have to keep track of counts associated with that prefix. The cost is thus distributed across the set of participating ASes and the edge AS on whose link the probe traffic entered will do the necessary accounting. Scenarios 4 and 5 are opportunity costs and provide maximal benefits so these are discounted.

A variety of attacks against honeypots occur routinely. The black hat community (i.e., hackers with malicious intent) exchanges information to help each other identify honeypots to reduce their chances of being identified. The most common technique is the use of zombie machines or reflectors. Other avenues of attack against mobile honeypots are quite likely. A few high-potential attacks that are possible are examined below.

Information about attacking honeypots is available publicly. A key difference in mobile honeypots is the setting up of honeypot machines to trace back attackers close to origination rather than to passively record information. The attackers cooperate by sharing information gleaned from their attacks not only of victims but also of traps, honeypots, and other anomaly detection systems. Commercial tools have been created to identify honeypots that test a variety of hosts and port combinations to classify them as honeypot or not. Reverse blacklists have been created so that other attackers can avoid visiting sites that run honey-pots. With mobile honeypots, the attackers have to locate the prefixes within the live duration of the announcement; thus they have to constantly monitor announcements. Even if they are able to glean the advertised dark prefixes and avoid them in future scans, those prefixes can later be legitimately assigned to valid customers. Unlike domains set aside to detect email spam and thus probers, the announcements are transient, random, and varied, making it much harder for attackers to use the information. Additionally, it increases the cost for attackers by forcing them to do additional work that has limited value. Probing techniques that take into account the collection of dark prefixes over a period of time would still be faced with the risk of being discovered by any of the ASes participating in the mobile honeypot scheme. Each probing IP address that is discovered is shared with all the participating ASes.

A common concern is that even if the originator of scan traffic or other unwanted traffic is identified, the source addresses may have been spoofed. Reflector attacks are known to occur: With a spoofed source address SS1, SYN or ping packets are sent towards a victim V1 which then replies to SS1 (a RST/SYN-ACK or a ping response). The probability of using a dark address as SS1 is relatively low and thus falsely identifying V1 as an originator of such attacks is not very high. Further, since the duration of liveness of the advertised dark prefix is a parameter under the control of the advertiser and is often a short period of time, the potential for identifying significant number of victims is lower. Even if a mobile honeypot is able to identify only spoofed source addresses, the information is of value. If a significant number of spoofed addresses are sending traffic through a certain link within an AS, the AS can monitor the link more closely. If a significant number of spoofed traffic originates from an AS, the information can be used as a way to possibly downgrade the links to that AS by its peers. One reason for the absence of wide deployment of traceback mechanisms is their cost. If it is possible to identify spoofed addresses significantly closer to their origination, this might spur the AS in question to take action. An alternative way to track down spoofed addresses can be done via Cisco Express Forwarding.

One or more of the ASes that is not cooperating may be a black-hat AS. Black-hat ASes are known to exist and information from them may be viewed as suspect. Black-hat ASes may not be willing to cooperate in which case its peers are free to downgrade the links to them. If Black-hat ASes actively co-operate and feed false source addresses knowing the destination dark prefixes, then these ASes would still be viewed as problematic ASes. Feeding false source addresses including ones that belong to one of the cooperating set of ASes would help unmask them. The downside is thus higher for black-hat ASes. Alternately, black-hat ASes can send information about current lists of dark prefixes to probing entities. This requires them to be in constant touch with all their 'friends' and constantly update a diverse set of changing prefixes.

There is also an existing problem of black-hat ASes advertising (or withdrawing) some other ASes prefixes. Many ISPs successfully filter any information coming from their customers and the Tier-1 ISP's route filter announcements on their peering sessions. Mobile honeypots do not make the problem any worse. If, however, an advertisement is sent marking certain prefixes as dark, diligent ISPs will be able to detect the black-hat AS.

Figure 3:
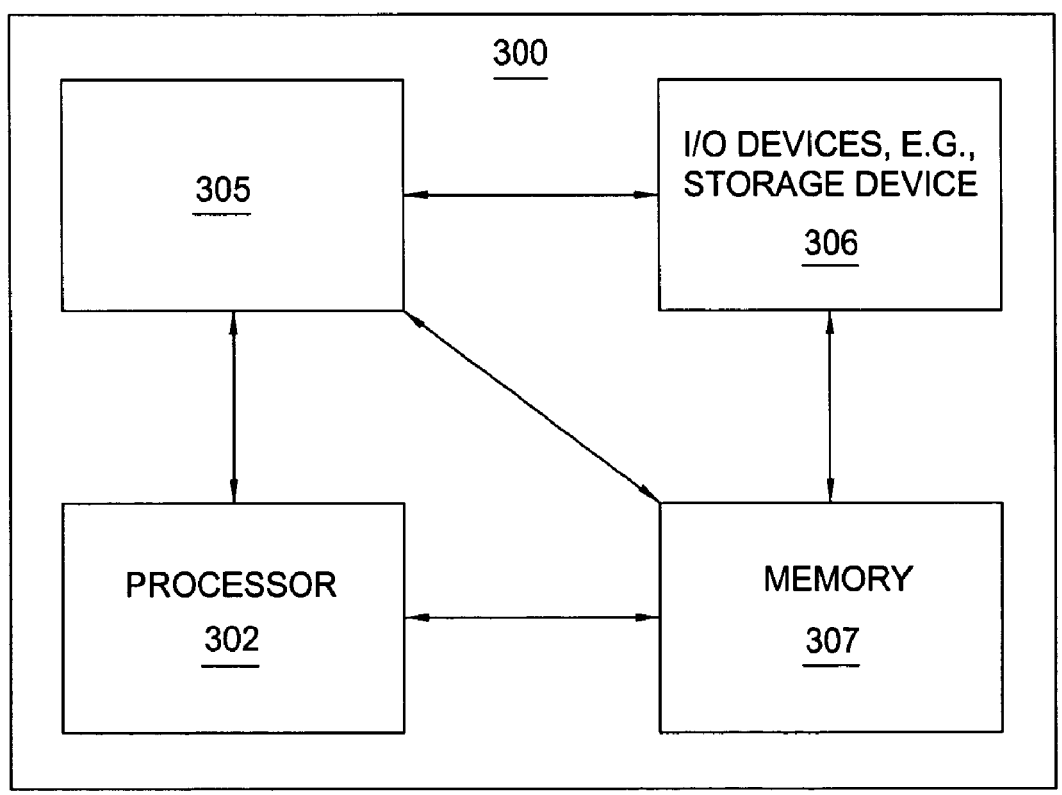
FIG. 3 illustrates a block diagram of a general purpose computer in accordance with one embodiment of the present invention.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), mobile honeypot module 305, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, mobile honeypot module 305 can be loaded into memory 304 and executed by processor 302 to implement the functions as discussed above. As such, mobile honeypot module 305 (including associated data structures) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method of detecting an originator of traffic of interest, comprising:
    establishing a honeypot in a first autonomous system controlled by a first network administrator, wherein the establishing the honeypot comprises:
        establishing in the first autonomous system a dark prefix associated with a destination;
        advertising the dark prefix; and
        collecting data associated with the traffic of interest received by the destination; and communicating to a network of friendly autonomous systems information that the dark prefix is associated with the honeypot, wherein the information is dynamically shared with the network of friendly autonomous systems, wherein the network of friendly autonomous systems comprises a second autonomous system that is controlled by a second network administrator that is different from the first network administrator.

2. The method of claim 1, wherein the destination sends default replies to an originator of the traffic of interest.

3. The method of claim 1, wherein the friendly autonomous systems take remedial action based on the information.

4. The method of claim 1, wherein a classification of the originator of the traffic of interest is determined in accordance with a threshold for the traffic of interest.

5. The method of claim 1, wherein the data associated with the traffic of interest is shared subsequently with other autonomous systems.

6. The method of claim 1, wherein an optional field is used along with the advertising the dark prefix, so that the network of friendly autonomous systems is aware that the dark prefix is associated with the honeypot.

7. The method of claim 6, wherein, in response to the optional field, the network of friendly autonomous systems drops the traffic of interest but communicates information about an originator of the traffic of interest.

8. The method of claim 6, wherein, in response to the optional field, the network of friendly autonomous systems identifies the traffic of interest, records information about an originator of the traffic of interest, and allows the traffic of interest to pass.

9. The method of claim 1, wherein the network of friendly autonomous systems maintains additional checks for traffic exceeding a threshold.

10. A non-transitory computer-readable medium having stored thereon a plurality of instructions, the plurality of instructions including instructions which, when executed by a processor, cause the processor to perform a method of detecting an originator of traffic of interest, comprising:
  establishing a honeypot in a first autonomous system controlled by a first network administrator, wherein the establishing the honeypot comprises:
    establishing in the first autonomous system a dark prefix associated with a destination;
    advertising the dark prefix; and
    collecting data associated with the traffic of interest received by the destination; and
  communicate to a network of friendly autonomous systems information that the dark prefix is associated with the honeypot, wherein the information is dynamically shared with the network of friendly autonomous systems, wherein the network of friendly autonomous systems comprises a second autonomous system that is controlled by a second network administrator that is different from the first network administrator.

11. An apparatus for detecting an originator of traffic of interest, comprising:
  a processor configured to:
    establish a honeypot in a first autonomous system controlled by a first network administrator by:
      establishing in the first autonomous system a dark prefix associated with a destination;
      advertising the dark prefix; and
      collecting data associated with the traffic of interest received by the destination; and
    communicating to a network of friendly autonomous systems that the dark prefix is associated with the honeypot, wherein the information is dynamically shared with the network of friendly autonomous systems, wherein the network of friendly autonomous systems comprises a second autonomous system that is controlled by a second network administrator that is different from the first network administrator.

12. The method of claim 1, wherein the information further comprises a change in the dark prefix.

13. The method of claim 12, wherein the change in the dark prefix comprises a length of the dark prefix being varied.

14. The method of claim 12, wherein the change in the dark prefix comprises a duration of the dark prefix being varied.

15. The method of claim 12, wherein the change in the dark prefix comprises a threshold for the traffic of interest received by the destination being varied.

\* \* \* \* \*